United States Patent
Brown et al.

(10) Patent No.: US 7,400,422 B2
(45) Date of Patent: Jul. 15, 2008

(54) METHOD, APPARATUS, AND PROGRAM TO PREVENT COMPUTER RECOGNITION OF DATA

(75) Inventors: Michael Wayne Brown, Georgetown, TX (US); Mark Joseph Hamzy, Round Rock, TX (US); Scott Thomas Jones, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1284 days.

(21) Appl. No.: 10/042,077

(22) Filed: Jan. 8, 2002

(65) Prior Publication Data

US 2003/0128382 A1    Jul. 10, 2003

(51) Int. Cl.
*G06F 15/00*   (2006.01)
*G06K 1/00*    (2006.01)
*G06K 15/02*   (2006.01)
*H04N 1/00*    (2006.01)

(52) U.S. Cl. .................. 358/1.14; 358/1.11; 358/401

(58) Field of Classification Search ............... 358/1.11, 358/1.14, 1.9, 3.28, 3.31, 401; 382/182, 382/185, 289–292, 321; 713/182
See application file for complete search history.

(56) References Cited

U.S. PATENT DOCUMENTS

| 5,666,191 A * | 9/1997 | Hasegawa et al. ........... 399/366 |
| 7,151,618 B2 * | 12/2006 | Yoshiaki ..................... 358/3.06 |
| 2002/0075492 A1 * | 6/2002 | Lee ............................ 358/1.9 |
| 2003/0005302 A1 * | 1/2003 | Searle ........................ 713/176 |
| 2003/0099378 A1 * | 5/2003 | Ide et al. ..................... 382/107 |
| 2005/0002053 A1 * | 1/2005 | Meador et al. ............. 358/1.14 |
| 2005/0114705 A1 * | 5/2005 | Reshef et al. ............... 713/201 |

\* cited by examiner

*Primary Examiner*—Edward L. Coles, Sr.
*Assistant Examiner*—James A. Thompson
(74) *Attorney, Agent, or Firm*—Duke W. Yee; Matthew W. Baea; Mari A. Stewart

(57) ABSTRACT

A text modification mechanism is provided for formatting data such that the information can be reasonably deciphered by a human, but cannot be easily recognized by computer recognition techniques. The text modification mechanism alters printed text so that computer recognition of characters becomes difficult. Modification of the text may be accomplished with manipulation of the fonts or the background. The mechanism may also modify the text based on user preferences.

12 Claims, 3 Drawing Sheets

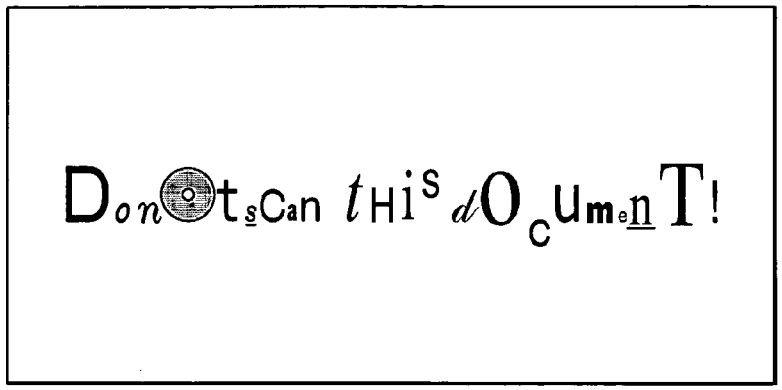
*FIG. 3A*
*FIG. 3B*
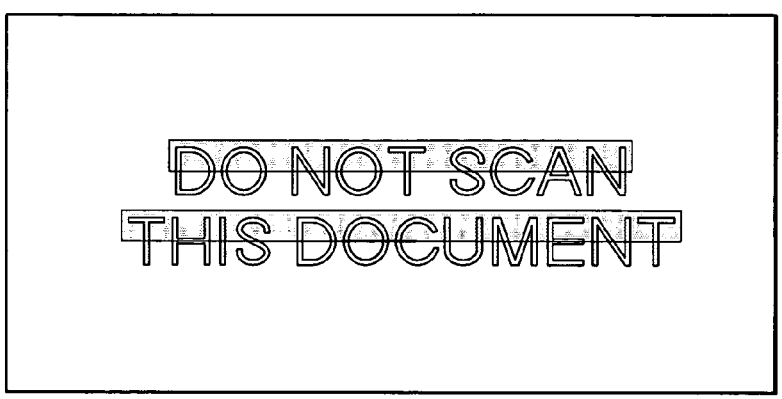
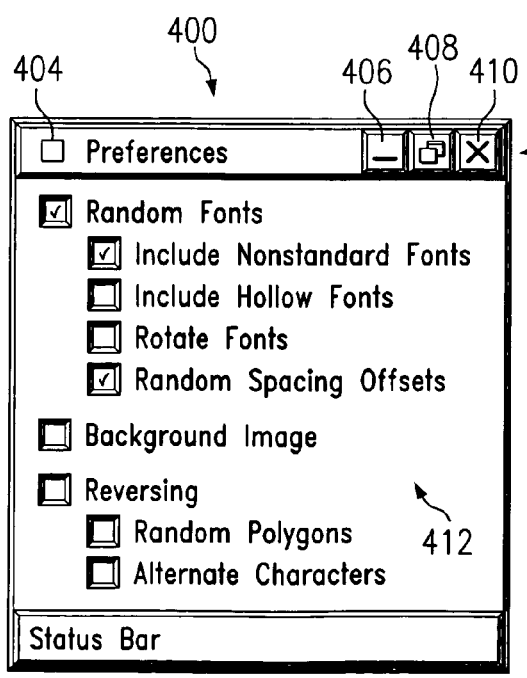
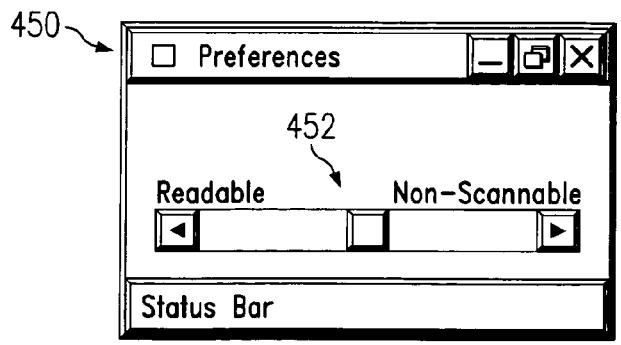
*FIG. 4A*  *FIG. 4B*

US 7,400,422 B2

METHOD, APPARATUS, AND PROGRAM TO PREVENT COMPUTER RECOGNITION OF DATA

BACKGROUND OF THE INVENTION

1. Technical Field

The present invention relates to data processing and, in particular, to printing documents. Still more particularly, the present invention provides a method, apparatus, and program to prevent computer recognition of data in printed documents.

2. Description of Related Art

A company may invest time and effort into producing a document that holds a value. For example, the document may include information that may be sold or the document may include secret information. However, once the document is printed, the information may be easily stolen and distributed by transforming the document into an electronic format. This may be done by scanning the document into a computer. Once the document is scanned into an image format, the computer may perform optical character recognition (OCR) on the scanned image.

OCR uses known fonts to identify characters in an image. OCR software has internal representations of the images, such as bitmaps, of each character in known fonts and compares them against the scanned document. The OCR software may then produce a text representation, such as American Standard Code for Information Interchange (ASCII).

The prior art has focused on techniques for preventing reproduction of documents using copy machines and facsimile machines. However, OCR remains as a possible method for unauthorized reproduction of a printed document. Therefore, it would be advantageous to provide a method, apparatus, and program to prevent computer recognition of data in printed documents.

SUMMARY OF THE INVENTION

The present invention provides a text modification mechanism for formatting data such that the information can be reasonably deciphered by a human, but cannot be easily recognized by computer recognition techniques. The text modification mechanism alters printed text so that computer recognition of characters becomes difficult. Modification of the text may be accomplished with manipulation of the fonts or the background. The mechanism may also modify the text based on user preferences.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A and 3B illustrate examples of printed text that are modified in accordance with a preferred embodiment of the present invention;

FIGS. 4A and 4B are examples of screens of display of preferences windows in accordance with a preferred embodiment of the present invention;

DETAILED DESCRIPTION OF THE PREFERRED EMBODIMENT

Figure 1:
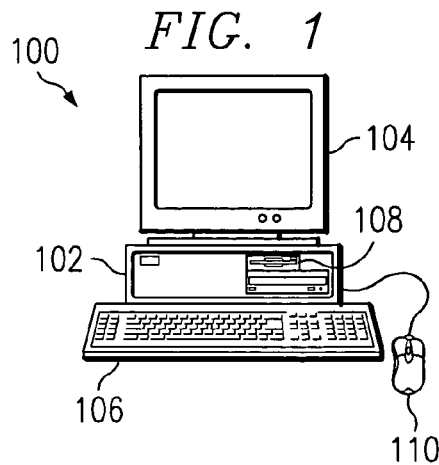
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
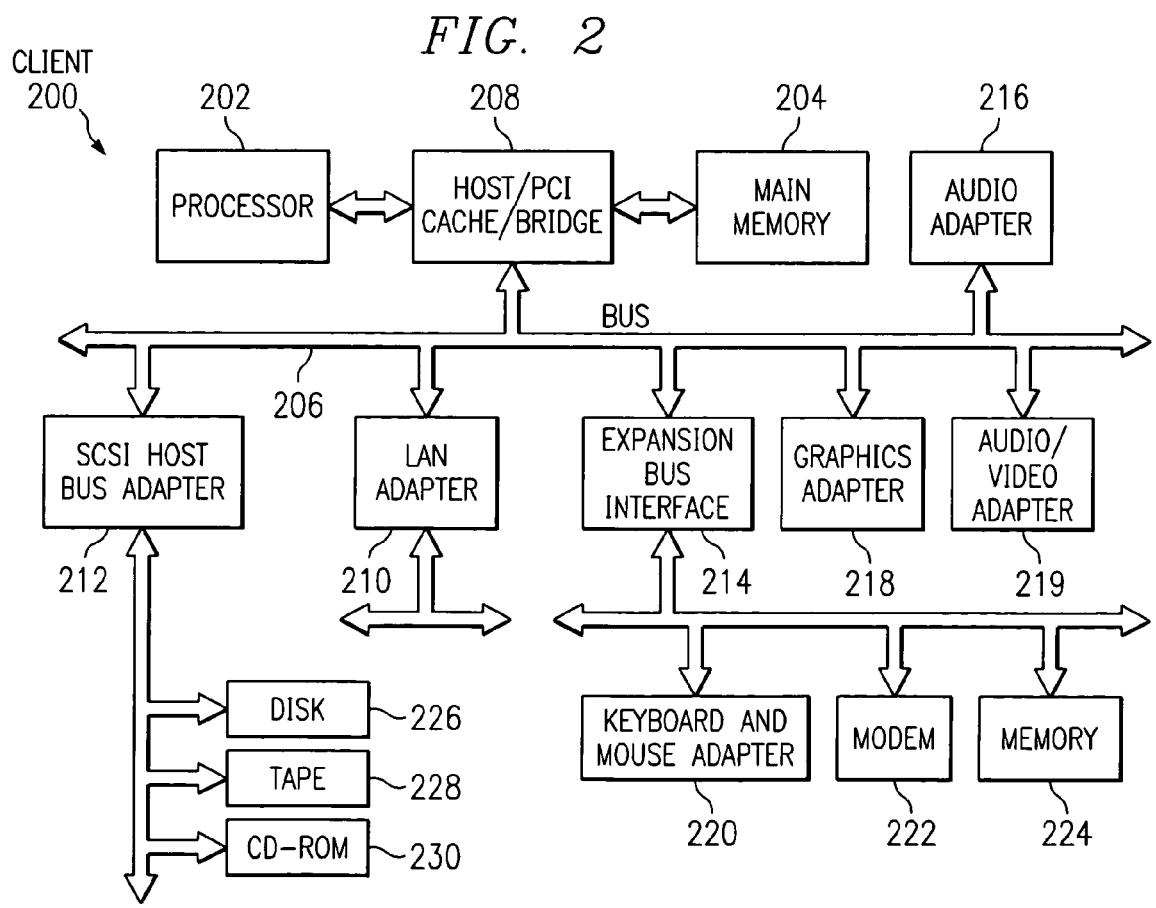
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

In accordance with a preferred embodiment of the present invention, a client computer includes a text modification mechanism for altering printed text so that the information is readable by a human, but cannot be easily recognized by computer recognition techniques. Text may be modified, for example, by changing the rotation of a font, using hollow fonts, using nonstandard fonts, using random spacing offsets.

FIGS. 3A and 3B illustrate examples of printed text modified in accordance with a preferred embodiment of the present invention. In the example shown in FIG. 3A, attributes of the text are randomized. Examples of attributes that may be randomized may be typeface, size, spacing offsets, and color. In addition, other effects may be randomly applied to characters, such as bold, italics, underlining, strike-through, subscript, superscript, shadow, and outline. In the example shown in FIG. 3A, attributes are randomized on a character by character basis; however, attributes may also be randomized on a word by word basis or another basis, such as line by line.

As illustrated by the example shown in FIG. 3B, another way to alter the text may be to have the top half of a character white on a black background and have the bottom half of a character black on a white background. Furthermore, random polygons split in half at some angle can make computer recognition more difficult.

A person of ordinary skill in the art will recognize that many techniques for modifying text may be used and the present invention is not intended to be limited to the examples shown herein. For example, the text modification mechanism may also introduce a background image or color. The text modification mechanism may also invert background and foreground for each character.

The text modification mechanism may also introduce a gradient film in the background causing the background to gradually change in color or intensity from top to bottom, from left to right, or at a given angle. For example, the top of the background may be black, the middle may be gray, and the bottom may be white. Or this example may be reversed. The text modification mechanism may also cause the color or intensity of the text to gradually change.

The text modification mechanism of the present invention may be embodied within an application that allows a document to be printed, such as a word processor or Web browser. Alternatively, the text modification mechanism may be a program extension or plug-in. When a text document is printed, text modification mechanism may automatically alter the properties of the text and/or the background to prevent computer recognition of data. The text may be altered according to user defined properties. These properties may be defined within the application, extension, or plug-in as the case may be.

In an alternative embodiment, the text modification mechanism may be embodied within a printer driver. Thus, the text modification mechanism may be enabled or configured using a page setup or printer properties dialog.

The examples shown in FIGS. 3A and 3B are exaggerated to illustrate the present invention. The modifications to the text and background may be more subtle to allow for a more readable document, while still preventing computer recognition of characters. When configuring the text modification mechanism, the user may be faced with a tradeoff between readability and non-scannability.

For example, the document may be distributed at a meeting. In this case, readability of the document is important. The text modification mechanism may then change the font of the text to a nonstandard font and use random spacing offsets. Character recognition algorithms typically recognize common or standard fonts, such as Arial and Courier. The text modification mechanism may simply change the font of the text to a nonstandard or uncommon font that is still easy to read. Thus, the document will be very easy to read, but computer recognition of the font will be difficult.

As another example, a document may consists of hundreds of pages of computer code that will be printed and stored in a file cabinet as evidence of reduction to practice. The printed document is not likely to ever be read. However, the computer code may contain sensitive secret information. In this case, readability is not important, but it is very important that the data is not computer recognizable. The text modification mechanism may then use every technique to obfuscate the text making optical character recognition extremely difficult.

Examples of screens of display of preferences windows are shown in FIGS. 4A and 4B in accordance with a preferred embodiment of the present invention. Particularly, with reference to FIG. 4A, the screen comprises window 400, including a title bar 402, which may display the name of the application program. Title bar 402 also includes a control box 404, which produces a drop-down menu (not shown) when selected with the mouse, and "minimize" 406, "maximize" or "restore" 408, and "close" 410 buttons. The "minimize" and "maximize" or "restore" buttons 406 and 408 determine the manner in which the program window is displayed. In this example, the "close" button 410 produces an "exit" command when selected. The drop-down menu produced by selecting control box 404 includes commands corresponding to "minimize," "maximize" or "restore," and "close" buttons, as well as "move" and "resize" commands.

The preferences window display area includes a dialog area 412 in which preferences may be set or modified. In the example shown in FIG. 4A, the user may enable "Random Fonts," "Background Image," and "Reversing." For example, the user may enable "Random Fonts" to instruct the text modification mechanism to randomize attributes of the fonts. The preferences dialog area 412 may also include preferences for actual attributes that may be set for the random fonts, such as "Include Nonstandard Fonts," "Include Hollow Fonts," "Rotate Fonts," and "Random Spacing Offsets." Other attributes may be included in the preferences within the scope of the present invention, such as color and effects.

The user may enable "Background Image" to introduce a background image to the document. A background image that allows text to be humanly readable while preventing computer recognition of characters may be preselected. Although not shown in the example in FIG. 4A, the preferences dialog area may include a field in which a background image filename may be entered. The preferences dialog may also include a "Browse" button to allow a user to browse files to select a background image.

The user may also enable "Reversing" to instruct the text modification mechanism to reverse the background and foreground of characters and portions of characters. As shown in preferences dialog area 412, a "Random Polygons" preference may be set to introduce random polygons split in half at some angle. Thus, each character may be outlined by a random polygon that is split in half. One half of the polygon can have black text on a white background and the other half of the polygon can have white text on a black background, for example. Further, an "Alternate Characters" preference may be set to reverse every other character.

As stated above, many techniques for modifying text may be used within the scope of the present invention and the user may be faced with a tradeoff between readability and non-scannability. The more text modification techniques that are used and the greater the extent to which the attributes are altered, the less readable the text will become. However, if fewer text modification techniques are used and if the extent to which the attributes are altered is less, more characters will be recognized by OCR.

Turning now to FIG. 4B, a preferences window 400 is shown with a readability slide bar 452. A user may use the readability slide bar to set a readability value. The text modification mechanism may then enable modification techniques and set limits based on the readability value. For example, readability slide bar 452 may allow a user to set a value within a range, such as between ten and one.

As an example, the text modification mechanism may be configured to introduce a first set of nonstandard fonts at a first value and a second set of nonstandard fonts at a second value. Limits to font sizes may vary with the readability value. As a further example, the text modification mechanism may introduce one of a set of background images based on the readability value.

In a preferred embodiment of the present invention, the user may define and save a set of preferences for each readability value. Thus, the user may control the manner in which the text and/or background is altered at varying degrees of readability. In an alternative embodiment, the text modification mechanism may be configured to automatically determine preferences based on a readability value.

Figure 5:
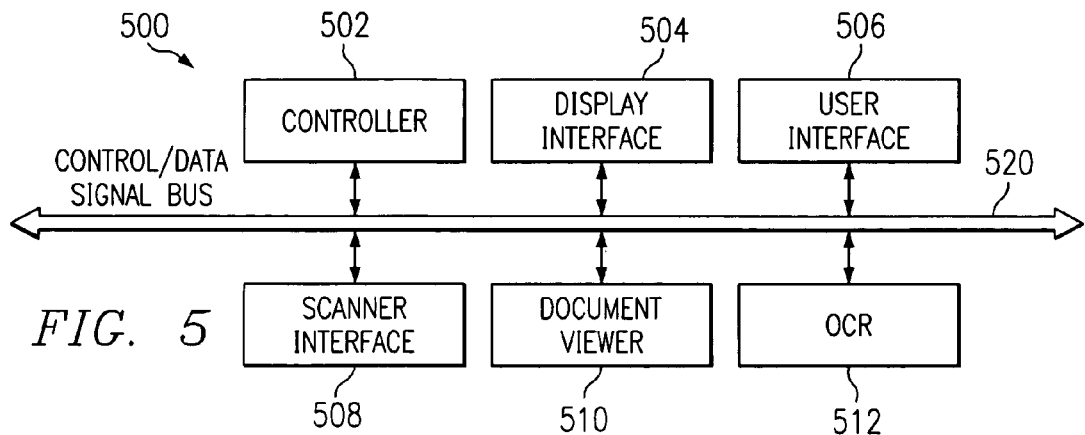
FIG. 5 is an exemplary block diagram of a document scanning system in accordance with a preferred embodiment of the present invention.

FIG. 5 is an exemplary block diagram of a document scanning system in accordance with a preferred embodiment of the present invention. Document scanning system 500 includes a controller 502, a display interface 504, a user interface 506, a scanner interface 508, a document viewer 510, and an optical character recognition (OCR) tool 512. The elements 502-512 may be implemented as hardware, software, or a combination of hardware and software. In a preferred embodiment, the elements 502-512 are implemented as software instructions executed by one or more processors.

The elements 502-512 are coupled to one another via the control/data signal bus 520. Although a bus architecture is shown in FIG. 5, the present invention is not limited to such. Rather, any architecture that facilitates the communication of control/data signals between elements 502-512 may be used without departing from the spirit and scope of the present invention. The controller 502 controls the overall operation of the document viewer and orchestrates the operation of the other elements 504-512.

With the operation of the present invention, document viewer 510 instructs controller 502 to display a document via display interface 504. Document viewer 510 may acquire documents from a scanning device via scanning interface 508. The user interacts with the document viewer via user interface 506. OCR tool 512 performs image processing functions to recognize text characters in the document.

Figure 6:
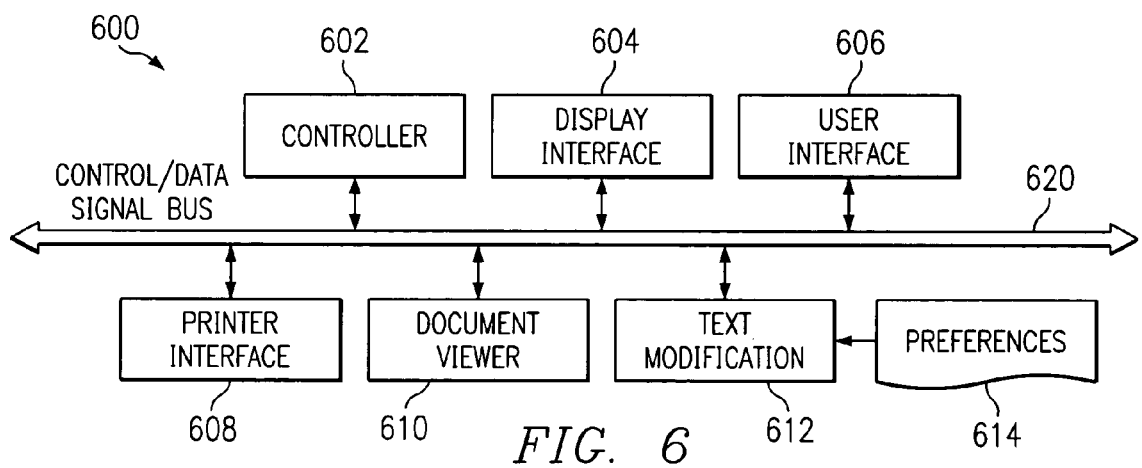
FIG. 6 is an exemplary block diagram of a document printing system with text modification in accordance with a preferred embodiment of the present invention.

FIG. 6 is an exemplary block diagram of a document printing system with text modification in accordance with a preferred embodiment of the present invention. Document viewing system 600 includes a controller 602, a display interface 604, a user interface 606, a printer interface 608, a document viewer 610, and a text modification tool 612. The elements 602-612 may be implemented as hardware, software, or a combination of hardware and software. In a preferred embodiment, the elements 602-612 are implemented as software instructions executed by one or more processors.

The elements 602-612 are coupled to one another via the control/data signal bus 620. Although a bus architecture is shown in FIG. 6, the present invention is not limited to such. Rather, any architecture that facilitates the communication of control/data signals between elements 602-612 may be used without departing from the spirit and scope of the present invention. The controller 602 controls the overall operation of the document viewer and orchestrates the operation of the other elements 604-612.

With the operation of the present invention, document viewer 610 instructs controller 602 to display a document via display interface 604. The user interacts with the document viewer via user interface 606. Text modification tool 612, when enabled, modifies the attributes of text in a printed document so that computer recognition of the characters will be difficult. Document viewer 610 may retrieve documents from a remote location.

In accordance with a preferred embodiment of the present invention, text modification tool 612 modifies attributes of a document presented by document viewer 610. The manner in which the document attributes are modified may be defined by the user using the user interface. The user may select text modification preferences, such as the preferences illustrated in FIGS. 4A and 4B. These parameters may be stored in preferences 614 and text modification tool 612 may use the preferences to determine the attributes for the printed document.

Figure 7:
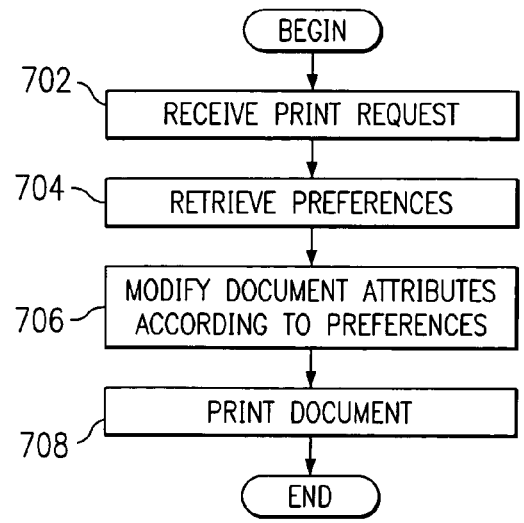
FIG. 7 is a flowchart of the operation of a document printing system in accordance with preferred embodiment of the present invention.

Turning next to FIG. 7, a flowchart of the operation of a document printing system is shown in accordance with preferred embodiment of the present invention. The process begins and receives a print request (step 702). Then, the process retrieves user preferences (step 704) and modifies the document attributes according to the user preferences (step 706). Next, the process prints the document (step 708) and ends.

The modifications to the document attributes may include altering text attributes, such as typeface and size, and background attributes, such as background image or gradient film. As stated above, many other techniques for obfuscating the printed text may be used to prevent computer recognition of data within the scope of the present invention.

Thus, the present invention solves the disadvantages of the prior art by providing a mechanism for formatting data such that the information can be reasonably deciphered by a human, but cannot be easily recognized by computer recognition techniques. The text modification mechanism alters printed text so that computer recognition of characters becomes difficult. The text modification techniques and the extent to which the text and background of the image are altered may be controlled by the user with user preferences. Thus, the user may easily control the readability of the document, while still preventing computer recognition of the text characters.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for preventing computer recognition of data, comprising:
   receiving a request to print a document;
   receiving a readability value from a user, wherein the readability value is a value within a range indicating a degree of readability of a text, wherein the readability value determines the degree to which the text is non-scannable within the range between readability and non-scannability, wherein a first set of nonstandard fonts are introduced into the text at a first readability value in the range and a second set of nonstandard fonts is introduced at a second readability value in the range, and wherein the text at the second readability value is more difficult to read and more difficult to scan by an optical character recognizer than the text at the first readability value;
   automatically determining at least one user preference based on the readability value;
   modifying the text in the document based on the at least one user preference so that the text cannot be recognized by a character recognition algorithm; and
   printing the document.

2. The method of claim 1, wherein the step of modifying comprises randomizing at least one attribute.

3. The method of claim 2, wherein the step of randomizing comprises randomizing the at least one attribute on a character by character basis.

4. The method of claim 2, wherein the step of randomizing comprises randomizing the attribute on a word by word basis.

5. The method of claim 2, wherein the at least one attribute comprises at least one of character rotation; typeface; font size; character effect; and spacing offset.

6. The method of claim 1, wherein the step of modifying comprises at least one of using an uncommon font;
   introducing a background image or a background color;
   introducing a gradient film to a background of the document; reversing background and foreground of characters; and reversing background and foreground of portions of characters.

7. The method of claim 1, wherein the step of modifying comprises enabling modification techniques and setting modification limits based on the readability value.

8. The method of claim 1, further comprising:
   receiving the at least one user preference from a user.

9. The method of claim 8, wherein the step of receiving the at least one user preference comprises:
   presenting a user interface.

10. The method of claim 9, wherein the user interface comprises a slide bar, wherein the at least one user preference comprises a readability value that is set using the slide bar.

11. The method of claim 10, wherein the at least one user preference comprises a readability value that is set using the slide bar wherein the step of modifying comprises enabling modification techniques and setting modification limits based on the readability value, and wherein modifying further comprises:
   modifying a background associated with the text.

12. The method of claim 11, wherein modifying the background associated with the text further comprises:
   providing a first half of a character in a first color on a first half of the background, wherein the first half of the background is a second color; and
   providing a second half of the character in the second color on a second half of the background, wherein the second half of the background is associated with the first color, and wherein the first color is a different color than the second color, wherein the step of modifying comprises enabling modification techniques and setting modification limits based on the readability value.

* * * * *